United States Patent
Garani et al.

(10) Patent No.: US 6,983,162 B2
(45) Date of Patent: Jan. 3, 2006

(54) METHOD FOR ENHANCING THE COMMUNICATION CAPABILITY IN A WIRELESS TELECOMMUNICATION SYSTEM

(75) Inventors: Pradeep Garani, Bangalore (IN); Mathieu Villion, Toulouse (FR); Michael Kotzin, Buffalo Grove, IL (US); Ray Owen, Bath (GB)

(73) Assignee: Motorola, Inc., Schaumburg, IL (US)

(*) Notice: Subject to any disclaimer, the term of this patent is extended or adjusted under 35 U.S.C. 154(b) by 57 days.

(21) Appl. No.: 10/489,230

(22) PCT Filed: May 27, 2002

(86) PCT No.: PCT/EP02/05829

§ 371 (c)(1),
(2), (4) Date: Aug. 25, 2004

(87) PCT Pub. No.: WO03/026231

PCT Pub. Date: Mar. 27, 2003

(65) Prior Publication Data

US 2005/0009524 A1   Jan. 13, 2005

(30) Foreign Application Priority Data

Sep. 14, 2001   (EP) ................................. 01402371

(51) Int. Cl.
 H04B 7/00   (2006.01)
 H04B 7/15   (2006.01)
 H04B 7/185   (2006.01)
 H04B 15/00   (2006.01)
 H04Q 7/20   (2006.01)

(52) U.S. Cl. ...................... 455/518; 455/519; 455/11.1; 455/13.1; 455/502; 455/41.2

(58) Field of Classification Search ................ 455/518, 455/519, 445, 11.1, 13.1, 502, 41.2, 517, 455/466, 15, 500, 526
See application file for complete search history.

(56) References Cited

U.S. PATENT DOCUMENTS

| | | | |
|---|---|---|---|
| 5,418,835 A * | 5/1995 | Frohman et al. | 455/413 |
| 6,044,272 A * | 3/2000 | Kobylinski et al. | 455/437 |
| 2001/0046875 A1 * | 11/2001 | Davies | 455/507 |
| 2001/0051529 A1 * | 12/2001 | Davies | 455/519 |
| 2002/0132632 A1 * | 9/2002 | Brassil et al. | 455/517 |
| 2002/0151320 A1 * | 10/2002 | Wasenius | 455/518 |

FOREIGN PATENT DOCUMENTS

| | | |
|---|---|---|
| DE | 199 50 005 A | 4/2001 |
| EP | 0 689 303 A | 12/1995 |
| WO | WO 00 54539 A | 9/2001 |

* cited by examiner

*Primary Examiner*—Wesley Kim
(74) *Attorney, Agent, or Firm*—Lalita W. Pace; Brian M. Mancini

(57) ABSTRACT

A method of enhancing a communication capability of a communication unit (112), operating in a communication system (100) that facilitates communication to and/or from a plurality of communication units. The method includes the step of operably coupling a first communication unit (112) to one or more neighboring communication units (114, 116) such that said communication unit is able to utilize at least one operational capability of one or more of its neighboring communication units to enhance communication to and/or from said first communication unit.

28 Claims, 3 Drawing Sheets

METHOD FOR ENHANCING THE COMMUNICATION CAPABILITY IN A WIRELESS TELECOMMUNICATION SYSTEM

FIELD OF THE INVENTION

This invention relates to using multiple subscriber units to create several architecture and subscriber unit enhancing functions, enhanced data rates and improved reliability in existing or future wireless, or integrated wireless and fixed, communication systems.

BACKGROUND OF THE INVENTION

Wireless communication systems, for example cellular telephony or private mobile radio communication systems, typically provide for radio telecommunication links to be arranged between a plurality of base transceiver stations (BTSs) and a plurality of subscriber units, often termed mobile stations (MSs).

The communication link from a BTS to a MS is generally referred to as a down-link communication channel. Conversely, the communication link from a MS to a BTS is generally referred to as an up-link communication channel.

In a wireless communication system, each BTS has associated with it a particular geographical coverage area (or cell). The coverage area is defined by a particular range where the BTS can maintain acceptable communications with MSs operating within its serving cell. Often these cells combine to produce an extensive coverage area.

Wireless communication systems are distinguished over fixed communication systems, such as the public switched telephone network (PSTN), principally in that mobile stations move between coverage areas served by different BTS (and/or different service providers) and, in doing so, encounter varying radio propagation environments.

In such wireless communication systems, methods for communicating information simultaneously exist where communication resources in a communication network are shared by a number of users. Such methods are termed multiple access techniques. A number of multiple access techniques exist, whereby a finite communication resource is divided into any number of physical parameters, such as:
  (i) frequency division multiple access (FDMA) whereby frequencies used in the communication system are shared,
  (ii) time division multiple access (TDMA) whereby each frequency used in the communication system, is shared amongst users by dividing the communication resource (each frequency) into a number of distinct time periods (time-slots, frames, etc.), and
  (iii) code division multiple access (CDMA) whereby communication is performed by using all of the respective frequencies, in all of the time periods, and the resource is shared by allocating each communication a particular code, to differentiate desired signals from undesired signals.

Within such multiple access techniques, different duplex (substantially simultaneous two-way communication) paths are arranged. Such paths can be arranged in a frequency division duplex (FDD) configuration, whereby a frequency is dedicated for up-link communication and a second frequency is dedicated for down-link communication. Alternatively, the paths can be arranged in a time division duplex (TDD) configuration, whereby a first time period is dedicated for up-link communication and a second time period is dedicated for down-link communication.

In the field of this invention it is known that a wireless cellular/mobile radio system's performance, capability, and coverage is highly dependent on a number of factors. For example, the subscriber data rate demand and the location of a subscriber may play a crucial role in determining the efficiency and availability of communication to/from the unit itself as well as to/from neighboring users. In addition, these factors are known to be very time-dependent, i.e. the factors vary widely over time. This is particularly the case in mixed voice and data wireless communication systems with users frequently switching between being active and inactivestates in, as well as being geographically widely dispersed within, the wireless communication system.

In the context of one-to-one or one-to-many wireless communications, for example in the field of private mobile radio (PMR), it is known that a MS may operate outside a dedicated network coverage area by communicating in a direct communication link with at least one other MS. Such a communication mode is generally referred to as either direct-mode operation (DMO) (when used in a conjunction with a system supporting trunked mode), conventional, two-way, or back-to-back communication.

Hence, when a MS operates in a direct mode, there is no system controller and therefore no centralised timing synchronisation or infrastructure-controlled power control to help set up calls, organise communication resource to minimise interference, etc.

In direct-mode, communication links are established in a similar manner as to the direct-mode operation of conventional half duplex radio schemes used by many existing private mobile radio systems such as that of the emergency services. Such calls are set up by a direct-mode (calling) communication unit selecting an address (e.g. 5-tone signalling sequence or digital selective calling) of a receiving (called) communication unit. The called communication unit then is directly contacted to set up a communication link.

Furthermore, as open communication systems are designed to share a finite communication resource, amongst a large number of subscriber devices, the subscriber devices are designed with operation and functionality limitations, such as a maximum data rate that they can transmit. Alternatively, they are designed to include all features possible, without any regard to whether the user will actually use them. This leads to inefficiency, as perceived by the user as well as with regard to the operation of the system.

In a wireless communication network, it is well known that radio transmissions are subjected to rayleigh fading, multipath and other noise-inducing effects. Therefore there is a need to provide some form of error protection and/or error correction to most transmissions. As particular transmissions require increased reliability, such as emergency calls, these transmissions are provided with increased amounts of error protection and thereby redundancy. Again, this is an inefficient use of what is always a limited resource.

In the context of linking wireless communication units, it is also known that linking cellular communication units directly together, using for example the Opportunity Driven Multiple Access (ODMA) mode proposed in UMTS (TDD mode), may provide enhanced data rates. In this mode of operation, some of the overall time-frequency resource of the system is used to enable mobiles to relay signals to other users.

As defined in 3GPP release 99 specification for UMTS TDD, OMDA can allocate a part of its resources to allow mobiles to relay information between themselves such that a mobile can 'connect' to a network through another mobile. Since the TDD system works on time-slots, it is possible to allocate part of the system resources for mobile to mobile communication. This type of system, can increase coverage at the cost of bandwidth.

As a consequence, in order to resolve such problems in a general sense, it would be helpful if the communication solution could be standardized. However, a major disadvantage with ODMA is that it is complex. Furthermore, ODMA requires a substantial amount of signalling resource, to facilitate the relaying of communications between the directly coupled cellular units. Therefore, due to the above difficulties with ODMA, it is unlikely that such a complex and resource-hungry solution would be acceptable in an open communication standard.

Thus, there exists a need in the field of the present invention to provide linking of multiple communication units wherein the above mentioned disadvantages may be alleviated.

STATEMENT OF INVENTION

In accordance with a first aspect of the present invention, there is provided a method of enhancing a communication capability of a communication unit, as claimed in claim 1.

In accordance with a second aspect of the present invention, there is provided a storage medium storing processor-implementable instruction.

In accordance with a third aspect of the present invention, there is provided a communication system.

In accordance with a fourth aspect of the present invention, there is provided a communication unit.

In accordance with a fifth aspect of the present invention, there is provided a portable communication unit.

In accordance with a sixth aspect of the present invention, there is provided a portable communication unit.

In accordance with a seventh aspect of the present invention, there is provided a portable communication unit.

In accordance with a eight aspect of the present invention, there is provided a portable communication unit.

Further aspects of the present invention are as claimed in the dependent claims.

In summary, in accordance with the preferred embodiment of the present invention, a concept of utilising multiple communication units (or user equipment (UE)) to increase the operational capabilities of a particular UE, or indeed the communication system, is described.

The basic architectural provisions support a discovery and coordination protocol where wireless devices discover a proximal user on a short-range system or wired bus and coordinate amongst themselves to achieve, for example enhanced functionality when compared with the functionality available with the particular UE alone.

BRIEF DESCRIPTION OF THE DRAWINGS

Exemplary embodiments of the present invention will now be described, with reference to the accompanying drawings, in which.

DESCRIPTION OF PREFERRED EMBODIMENTS

Figure 1:
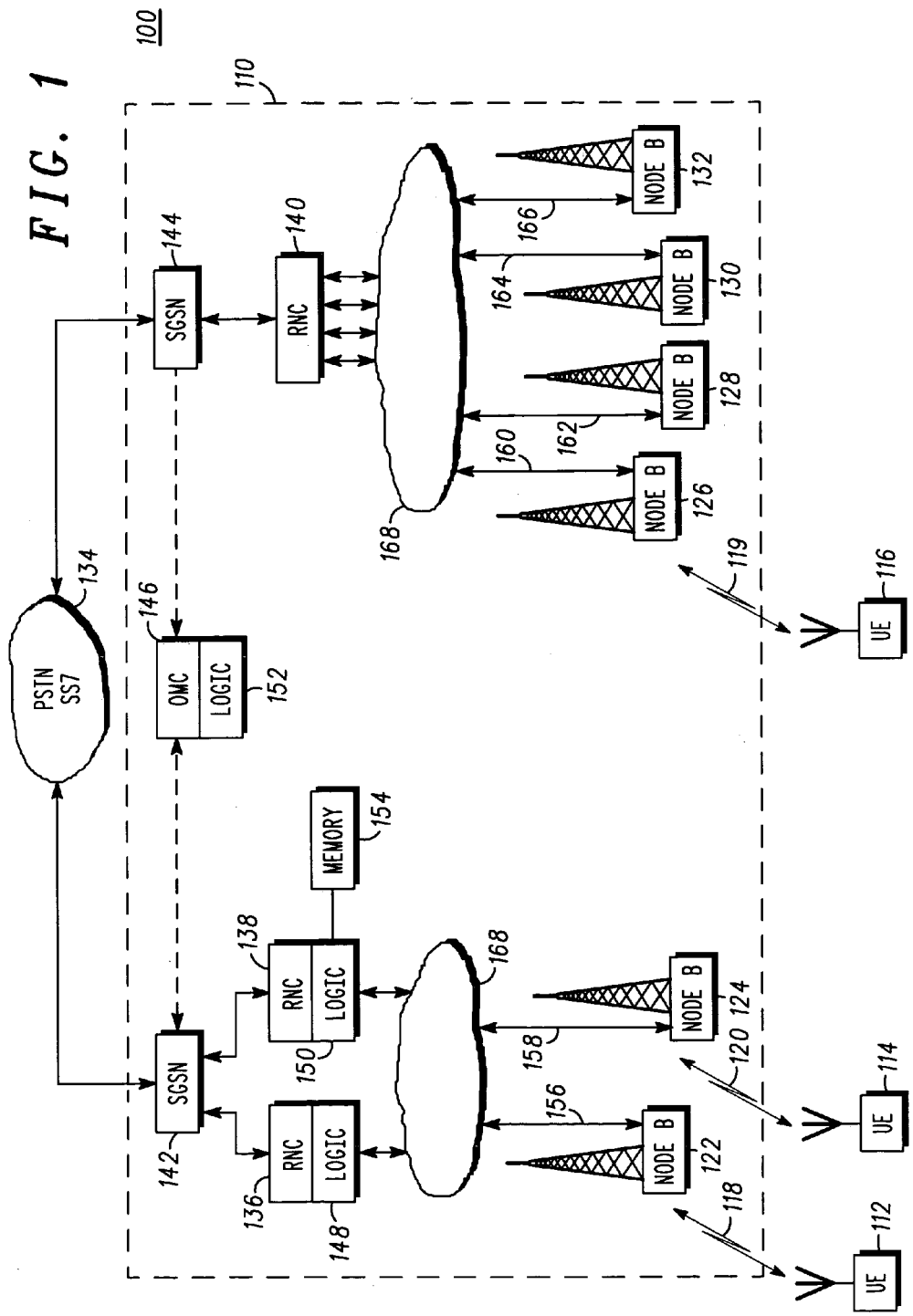
FIG. 1 shows a block diagram of a communication system that can be adapted to support the various inventive concepts of a preferred embodiment of the present invention.

Referring now to FIG. 1, a cellular-based telephone communication system 100 is shown in outline, in accordance with a preferred embodiment of the invention. In the preferred embodiment of the invention, the cellular-based telephone communication system 100 is compliant with, and contains network elements capable of operating over, a UMTS air-interface. In particular, the invention relates to the Third Generation Partnership Project (3GPP) specification for wide-band code-division multiple access (WCDMA) standard relating to the UTRAN radio Interface (described in the 3G TS 25.xxx series of specifications).

A plurality of subscriber terminals (or user equipment (UE) in UMTS nomenclature) 112, 114, 116 communicate over radio links 118, 119, 120 with a plurality of base transceiver stations, referred to under UMTS terminology as Node-Bs, 122, 124, 126, 128, 130, 132. The system comprises many other UEs and Node Bs, which for clarity purposes are not shown.

The wireless communication system, sometimes referred to as a Network Operator's Network Domain, is connected to an external network 134, for example the Internet. The Network Operator's Network Domain (described with reference to both a $3^{rd}$ generation UMTS and a $2^{nd}$ generation GSM system) includes:

(i) A core network, namely at least one Gateway GPRS Support Node (GGSN) 144 and or at least one Serving GPRS Support Nodes (SGSN); and (ii) An access network, namely:
  (ai) a GPRS (or UMTS) Radio network controller (RNC) 136–140; or
  (aii) Base Site Controller (BSC) in a GSM system and/or
  (bi) a GPRS (or UMTS) Node B 122–132; or
  (bii) a Base Transceiver Station (BTS) in a GSM system.

The GGSN/SGSN 144 is responsible for GPRS (or UMTS) interfacing with a Public Switched Data Network (PSDN) such as the Internet 134 or a Public Switched Telephone Network (PSTN) 134. A SGSN 144 performs a routing and tunnelling function for traffic within say, a GPRS core network, whilst a GGSN 144 links to external packet networks, in this case ones accessing the GPRS mode of the system The Node-Bs 122–132 are connected to external networks, through base station controllers, referred to under UMTS terminology as Radio Network Controller stations (RNC), including the RNCs 136, 138, 140 and mobile switching centres (MSCs), such as MSC 142 (the others are, for clarity purposes, not shown) and SGSN 144 (the others are, for clarity purposes, not shown).

Each Node-B 122–132 contains one or more transceiver units and communicates with the rest of the cell-based system infrastructure via an $I_{ub}$ interface, as defined in the UMTS specification.

Each RNC 136–140 may control one or more Node-Bs 122–132. Each MSC 142 provides a gateway to the external network 134. The Operations and Management Centre (OMC) 146 is operably connected to RNCs 136–140 and Node-Bs 122–132 (shown only with respect to Node-B 126 for clarity). The OMC 146 administers and manages sections of the cellular telephone communication system 100, as is understood by those skilled in the art.

In the preferred embodiment of the invention, a number of UEs 112–116 and in certain embodiments at least one Node-B 122–132 have been adapted, to offer, and provide for, transmission, reception and processing of information to and/or from multiple UEs to enhance a UE's particular functionality.

More particularly, in this embodiment the above elements have been adapted to implement the present invention in either or both transmitting and receiving modes of operation, such that in this embodiment the invention may be applied to both down-link and up-link transmissions.

It is also within the contemplation of the invention that such adaptation of the physical layer (air-interface) elements may be alternatively controlled, implemented in full or implemented in part by adapting any other suitable part of the communication system 100. For example, equivalent elements such as intermediate fixed communication units in other types of systems may, in appropriate circumstances, be adapted to provide or facilitate the multiple UE utilisation arrangement as described herein.

Although the preferred embodiment of the invention is described with reference to a wireless communication system employing a UMTS air-interface, it is within the contemplation of the invention that the inventive concepts described herein can be applied to any fixed or wireless communication system. In particular, the preferred embodiments of the present invention are described with reference to a bluetooth short-range radio connection between wireless subscriber units that ordinarily operate on the UMTS system. Bluetooth offers a high date rate, fast response protocol that is suited to some of the embodiments described.

Figure 2:
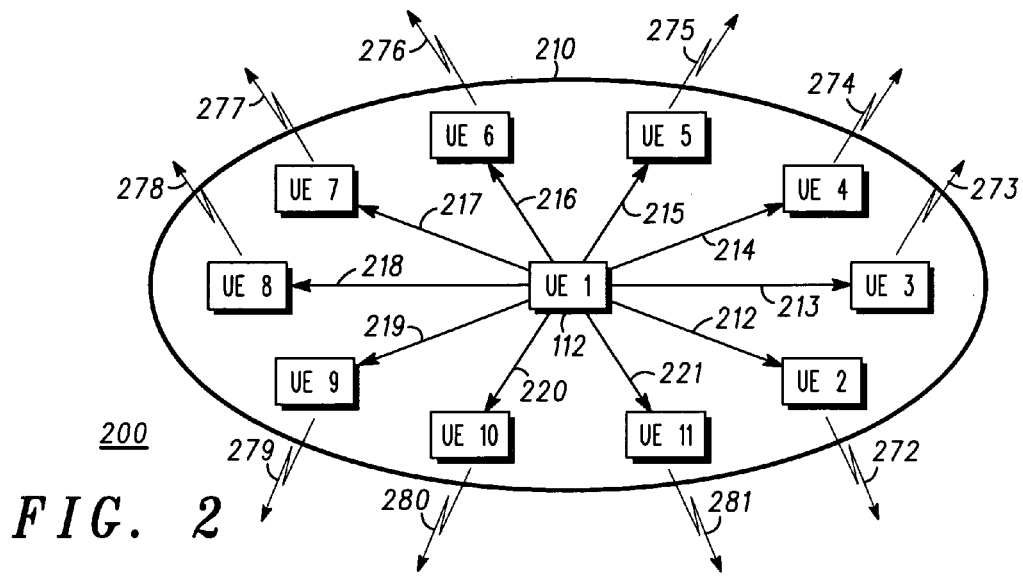
FIG. 2 shows a functional block diagram of an uplink communication arrangement in accordance with various inventive concepts of a preferred embodiment of the present invention.

Embodiment 1:

Referring now to FIG. 2, a diagram of an uplink communication configuration 200, for example a configuration of a plurality of user equipment (UE) of FIG. 1 is shown, the configuration being adapted to support the inventive concepts of a first embodiment of the present invention. In accordance with the first embodiment of the present invention, a UE, say UE-1 112 wishes to initiate an enhanced functionality mode of operation. Such enhanced functionalities may include a desire to send a large amount of data, or high priority data such as an emergency call that is needed to be received in a short period of time, or poor signal quality conditions. Such a transmission will occur on uplink channels.

In order to initiate the enhanced functionality mode of operation, UE-1 112 sets itself up as the 'master' communication unit in the first embodiment, in order to control the communication with the other UEs (UEs 2–11) that it uses for its uplink communication.

As shown in FIG. 2, geographically near (in a wireless communication system, such as Bluetooth) or interconnected (in a fixed communication system) UEs 2–11 receive a communication 212–221 from the master unit UE-1 112.

Once UE-1 112 has initiated a master-slave transmission mode of operation, each of the communicating UEs 2–11 are configured as slave units, being responsive to the control exerted by UE-1 112, using a master-slave protocol.

Each device is capable of, and configured to offer (in response to the request from UE-1 112), routing of received data 272–281 from the master device UE-1 112 to a central unit or serving unit. In a wireless UMTS domain, such a serving unit would comprise one or mode Node Bs 122–132. FIG. 2 shows all of the UEs within geographic coverage of a particular cell 210 served by a particular Node B.

However, it is within the contemplation of the invention that such transmissions may be effected to one or more Node Bs if a master device UE-1 112 is on an edge of a cell and one or more neighboring (slave) UEs are geographically proximal to UE-1 112 but operational on one or more adjacent cells. As such, the received data from UEs 2–11, via a number of Node Bs is re-configured into the originally transmitted data stream in the higher layers of the network, for example the RNC 136, 138, 140 or GGSN/SGSN 144.

The master UE-1 112 controls the data transacted with each terminal. In this way, multiple units can be drafted in as additional slave units to assist the communication and thereby create larger data throughput and enable throughput sharing. It also creates the opportunity of multiplexing many users to one phone and, when extended thoughout the communication system, many phones to many users.

As an alternate embodiment of FIG. 2, it is within the contemplation of the invention that each of the UEs may interface to a non-UE terminal, for example a centrally located computer terminal that serves as the master.

Embodiment 2:

In accordance with a second embodiment of the present invention, a group of independent wireless devices are identified and coordinated (aggregated) using, for example in a wireless domain a short-range wireless system such as provided in the adjunct Bluetooth system.

By forming a 'dynamic' group based on proximal location via a short-range adjunct bluetooth system, any of the users UEs 1–11 may then benefit from using the capabilities of one or more of the other subscriber units within the group. This is in contrast to the first embodiment where a particular UE dynamically sets up a group to operate in a master-slave configuration for one or more specific tasks.

The provision, in the second embodiment, of such a larger communication "pipe" for use by any of the UEs in a group leads to, inter-alia, increased efficiency, for example, using a higher peak data-rate over the air interface for a packet data transmission.

A group of proximal users can co-operate for a high data-rate service and communicate over the short-range system before accessing the shared channel of the system. In this manner, they are able to resolve amongst themselves, an access procedure. Collectively, they reduce the total number of collisions on the system shared channel, thereby increasing system utilisation.

The proximal group of users are preferably selected/co-ordinate using a discovery and coordination protocol such as that described with regard to the first embodiment. It is envisaged that such a protocol would preferably use the short-range, say Bluetooth, adjunct channel. The adjunct channel is preferably dedicated for such use, where the various user groups are able to dynamically form or join an aggregated group that can be used for the enhanced communication mode.

One example of the enhanced operation is where a UE is limited to a maximum number of received or transmitted bursts per unit period of time—as is always the case. To increase the received or transmitted data rate above the imposed limit, the UE could ask one or more inactive mobiles in the group to initiate calls or assist in communications, for this resource-limited user.

Using a discovery and coordination protocol on a short-range adjunct channel, these users become part of an aggregated group that can be used for such increased data rate transmissions. For example, in FIG. 2, UE-1 112 may decide to upload a very large file to the network. In normal circumstances, UE-1 112 would be limited to its maximum transmission rate of say, 64 kbps. Instead, utilising the inventive concepts herein described, UE-112 forms a dynamic group of idle UEs 2–11 and distributes the information for transmission to all the users of the aggregated group using the adjunct Bluetooth channel. Such a distribution of information may take place during UE-1 112's periods of inactivity on its primary-communication UMTS system.

It is also within the contemplation of the invention that each member of the group may carry different amounts of data based on the link conditions or the UEs particular configuration or capabilities. However, if we assume for simplicity that each member is also limited to a maximum transmission rate of 64 kbps, the effective maximum is 640 kbps. It is also within the contemplation of the invention that UE-1 112 may also transmit information in a substantially simultaneous manner to the network increasing the effective maximum data-rate to 704 kbps.

This method uses protocols supported at both the UEs and the central unit/serving unit to provide the multiplexed data service, whilst substantially avoiding any signalling impact to the main wireless UMTS system.

Furthermore, the protocol and control scheme preferably supports the distribution of the data to the independent members of the aggregated group, as well as the re-configuration of the information in the network. It is envisaged that each of the respective transmissions from the group members will carry a data field signifying that the transmission is one part of a larger transmission. The data field would also contain an indication of where the respective transmission is to be located in the larger transmission.

It is further within the contemplation of the invention that the participating UEs 1–11 might be working on different systems such as GSM, UMTS, as further described in embodiment 9. In such a scenario, it is possible to exchange link quality information between the aggregate members and the networks for improved network efficiency.

It is noteworthy that each UE may not experience the same quality of communication within the network, for example in a wireless domain, a particular UE may be subject to rayleigh fading or multipath conditions. Also, some users might generate less interference and/or experience better link quality. Hence, it is also within the contemplation of the invention that this fact is beneficially exploited. For example, a UE located in a more optimal location, for example near a window, might be able to carry a larger burden of the traffic for the group. Alternatively, better-positioned UEs may not need to error protect the transmitted data to the same degree, thereby increasing traffic throughput.

This information might be determined by the network or by the UEs themselves. This invention anticipates sharing such link quality information not only with the network but also with the other members of the aggregated group. This would allow altering how communication is carried out within the network to increase efficiency whilst maintaining a particular quality of service.

In summary, the second embodiment advantageously provides at least the following new concepts: a wireless UE with Bluetooth adjuncts, a protocol for establishing an aggregated group of proximal users, protocol support in both the UEs and the network to beneficially exploit communication between UEs and the network using the distributed radio resources of the proximal users, and optionally, taking advantage of the different quality, etc. of the different subscribers' links to the infrastructure.

Embodiment 3—Alternative Emergency Call

In a yet further embodiment of the present invention, a further enhanced uplink application is provided. A large number of remote communication units now offer emergency call facilities, namely the ability to make a high priority call to a central receiving station. Examples of emergency calls include a call to the Emergency services in the case of say a cellular phone, or a call to the dispatcher in the case of a mobile radio.

The inventors of the present invention have recognised a further functionality enhancing operation in the re-use of selected (or random) neighboring UEs for emergency calls. As an example, let us consider the case when the user of the UE wishes to make an emergency call. However, the UE may not be within coverage range, say, of its serving Node B, and therefore it is unable to contact the network.

The inventors of the present invention have envisaged that the user/UE could request other selected or random neighboring UEs to set up the emergency call or indeed forward the emergency call information. The emergency call information may be submitted to neighboring UEs using, for example, a short-range bluetooth, infra-red, wireless local loop or similar communication medium.

Figure 3:
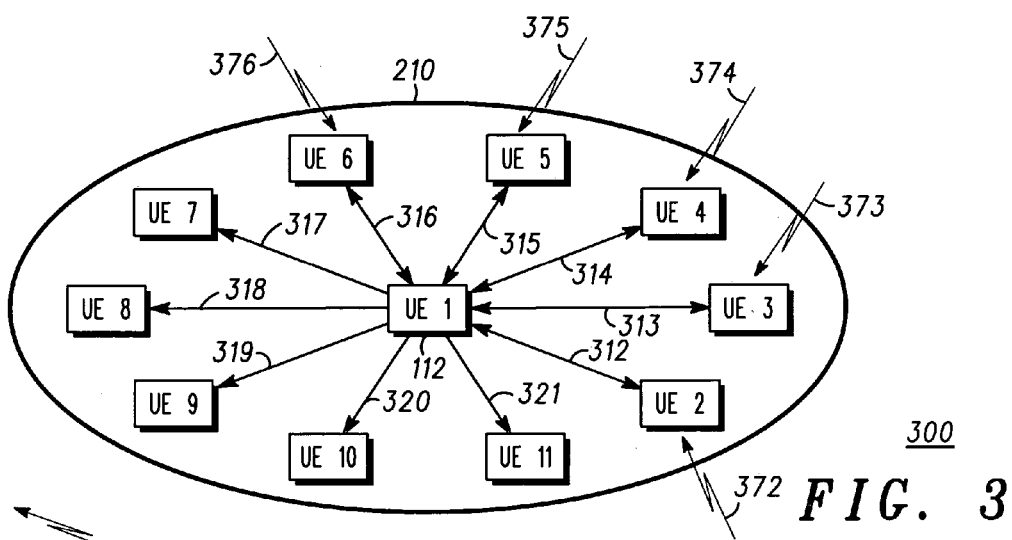
FIG. 3 shows a functional block diagram of an downlink communication arrangement in accordance with various inventive concepts of a preferred embodiment of the present invention.

Embodiment 4:

Referring now to FIG. 3, a block diagram of a communication configuration, for example a configuration of the user equipment (UE) of FIG. 1 adapted to support the inventive concepts of the present invention, is shown. The first and second embodiments are described with reference to a UE wishing to transmit large amounts of data in an uplink direction. However, it is within the contemplation of the invention that the dynamic utilisation of neighboring UE resources is equally applicable in a downlink scenario.

Initially, a subscriber unit UE-1 112 performs a device discovery 312–321 polling operation with other nearby subscriber units UEs 2–11. For available and suitable UEs, for example UEs 2–6, UE-1 112 negotiates with the selected neighboring UEs to determine how they are able to assist UE-1 112 in receiving downlink data 372–376 intended for UE-1 112.

It is within the contemplation of embodiment 4 that the a polling operation can also be registration based, with participating devices registering with each other in response to a poll or when they detect activity on the adjunt channel.

In the preferred arrangement of embodiment 4 of the present invention, UEs also attempt to receive wireless data transmissions to UE-1 112 from the network. If UE-1 112 fails to decode his data, UE-1 112 asks any of the selected neighboring UEs whether the data they accurately received such data. If the data is available from one or more selected neighboring UEs, UE-1 112 receives the intended transmission from the network via the alternate communication path 312–316.

In an alternative mode of operation of embodiment 4, as shown in FIG. 3, a subscriber such as UE-1 112 may always receive augmenting data from nearby selected neighboring UEs. In this permanent repeater mode of operation, described in greater detail with regard to embodiment 10, it is envisaged that UE-1 112 utilises the received augmenting data to increase its decoding probability, as further described in embodiments 6, 7 and 8.

It is envisaged that if UE-1 112 is not able to receive the augmenting data even by combining (or selecting) from all the available inputs, a negative-acknowledgement message (nack) may be sent. Similarly, if the UE-1 112 is successful at decoding, it is envisaged that an acknowledgement message (ack) is sent, as per the protocol UE-1 112 is obliged to support in connection with the network.

It is also within the contemplation of the invention that the inventive concepts described herein are not limited to the use of UEs in a UMTS system, but can be applied to any wireless communication device. Embodiment 4 is therefore applicable for use with all kinds of personal wireless communications devices, such as a cellular phone, a portable or mobile radio, a personal digital assistant, a laptop computer or a wirelessly networked PC.

In summary, embodiment 4 provides for an adjunct short-range system to enhance communication to a particular UE to utilise the capabilities or features of one or more selected neighboring UEs. The communication enhancement preferably follows a discovery and feature negotiation protocol. It is noteworthy that embodiment 4 provides a means to augment reception of information intended for a particular communication unit, in contrast to a means to route information using intermediate links, which is known in the art.

Embodiment 5:

As a particular case of embodiment 4, embodiment 5 provides a further means of assisting a UE, say UE-1 112, in downlink communication. To better explain the features of embodiment 5, let us consider the scenario where people having cellular phones gather at meetings. Current cellular phones are only used in an independent manner. This means that each user is limited to the radio performance capabilities of his/her particular cellular phone. Furthermore, typical implementation-specific limitations designed into the cellular system mean using a single omnidirectional antenna, a single branch receiver (since diversity is difficult to provide in small units) and a single branch transmission system are used.

Such limitations are resolved with embodiment 5 by provision of a group of independent wireless devices that are identified and coordinated (aggregated) using a short-range system (e.g. Bluetooth). Each user receives information from the conventional communication system, for example the UMTS cellular system of FIG. 1. Each user then forwards the received information to at least one other UE. The subscriber then beneficially combines the multiple received copies to improve reliability of detection (diversity combining).

As an example, utilising the arrangement of FIG. 3, a proximal group of users are identified using say, the aforementioned discovery and coordination protocol using the short-range adjunct channel. As before, these users become part of an aggregated group that can be used for enhanced communication purposes. In FIG. 3, UEs 2–6 receive information from the UMTS cellular system and forward the received information 312–316 using the short-range system, to UE-1 112. UE-1 112 optimally combines this multiple-received information to improve its reliability of detection.

It is envisaged that appropriate synchronisation mechanisms may be used in order to co-ordinate the timing and processing of the multiple received signals.

In summary, embodiment 5 provides, in the downlink context, the following new features: a subscriber combining multiple sets of information to obtain a diversity benefit; provisions for certain network support for certain modes of use (eg. multiple transmit codes); a Node B beneficially combining multiple subscribers' information sent on different codes to obtain a diversity benefit.

Figure 4:
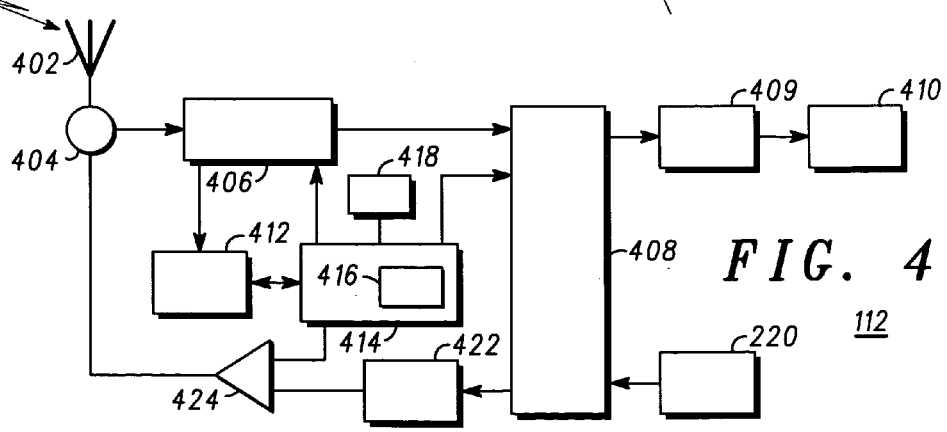
FIG. 4 shows a block diagram of a communication unit that can be adapted to support the various inventive concepts of a preferred embodiment of the present invention.

Referring now to FIG. 4, a block diagram of a communication unit, for example user equipment (UE) 112, adapted to support the various inventive concepts of the embodiments of the present invention, is shown. It is within the contemplation of the invention that a similar block diagram would apply to a Node B element, say Node B 122. Therefore the foregoing description of FIG. 4 is described such that it also encompasses an implementation of a Node B baseband processing circuit, as would be appreciated by a person skilled in the art.

The UE 112 contains an antenna 402 preferably coupled to a duplex filter or circulator 404 that provides isolation between receive and transmit chains within UE 112.

The receiver chain includes scanning receiver front-end circuitry 406 (effectively providing reception, filtering and intermediate or baseband frequency conversion). The scanning front-end circuit 406 scans signal transmissions from its associated Node B. The scanning front-end circuit 406 is serially coupled to a signal processing function (processor, generally realised by a DSP) 408. The final receiver circuits are a baseband back-end circuit 409 operably coupled to a display unit 410, if the communication unit is a subscriber unit.

Alternatively, if the communication unit is a Node B, the final receiver circuits are a baseband back-end circuit 409 operably coupled to an interface port 410, in order to forward the demodulated received signal to, say, a radio network controller (RNC).

In accordance with the downlink embodiments of the invention, the receiver chain 410, in particular the signal processing function 408, coupled to the baseband back-end circuit 409, has been adapted for a receiving communication unit to receive and process multiple signals from neighboring UEs. Furthermore, the processing circuit has been adapted to receive and process the transmissions from neighboring UEs during the discovery and negotiation processes.

A controller 414 is operably coupled to the scanning front-end circuitry 406 so that the receiver can calculate receive bit-error-rate (BER) or frame-error-rate (FER) or similar link-quality measurement data from recovered information via a received signal strength indication (RSSI) 412 function. The RSSI 412 function is operably coupled to the scanning front-end circuit 406. In a similar manner to the adaptation of the signal processing function 408 above, the controller has been adapted to control transmission and reception of signals from the UE 112 to facilitate use of neighboring UEs.

The memory device 416 stores a wide array of UE-specific data, such as decoding/encoding functions, timing details, neighbor and serving cell information relating to timing, channels, power control and the like. In addition, the memory unit 416 has now been adapted to store neighboring UE information for use with the functionality enhancing embodiments described herein.

A timer 418 is operably coupled to the controller 414 to control the timing of operations, namely the transmission or reception of time-dependent signals, within the UE 112.

In the context of the preferred embodiment of the present invention, timer 418 is used to synchronize the timing of the receiving and or transmitting portions of the UE 112 to be able to handle transmissions to and/or from the selected neighboring UEs.

For completeness, in broad terms, the transmit chain of the communication unit (either a UE or Node B) essentially includes an input device 420, such as a microphone, coupled in series through a processor 408, transmitter/modulation circuitry 422 and a power amplifier 424. The processor 408, transmitter/modulation circuitry 422 and the power amplifier 424 are operationally responsive to the controller, with an output from the power amplifier coupled to the duplex filter or circulator 404, as known in the art.

In a similar manner to that described above for the downlink embodiments, adaptation of the signal processing function 408, controller 414, timer 418 and memory device 416 has been performed to effect uplink transmissions to selected neighboring UEs, as would be appreciated by those skilled in the art.

The signal processor function 408 in the transmit chain may be implemented as distinct from the processor in the receive chain. Alternatively, a single processor 408 may be used to implement processing of both transmit and receive signals, as shown in FIG. 4.

Of course, the various components within the communication unit 400 can be realised in discrete or integrated component form, with an ultimate structure therefore being merely an arbitrary selection.

More generally, any communication enhancement mode/UE utilisation associated with the preferred embodiment of the present invention may be implemented in any suitable manner. For example, new apparatus may be added to a conventional communication unit (for example UE 112, or Node B 122), or alternatively existing parts of a conventional communication unit may be adapted, for example by reprogramming one or more processors therein. As such the required adaptation may be implemented in the form of processor-implementable instructions stored on a storage medium, such as a floppy disk, hard disk, PROM, RAM or any combination of these or other storage multimedia.

In the preferred embodiments of the present invention, the UEs communicate to exchange capabilities and negotiate which functions of the individual UE(s) will be realised.

It is envisaged that one or more of the following functions may be used within a receiving UE to assist in the functionality enhancing processes:

a) Joint decoding
b) Joint demodulation
c) Joint equalization
d) Multi-mode operation
e) Multiplexing and de-multiplexing data for higher throughput Embodiment 6—Joint Decoding When the UEs are of the same architecture and type, they are operably coupled to a receiving (intended) UE to allow joint decoding or joint equalization of received information so that the effective throughput and/or reliability of the received signal(s) is increased. A number of joint decoding possibilities are described in more detail with reference to FIGS. 5a–5c. The UMTS transmitter/UE receiver arrangements of FIGS. 5a–5c are described with reference to a downlink functionality enhancement mode of operation.

Figure 5A:
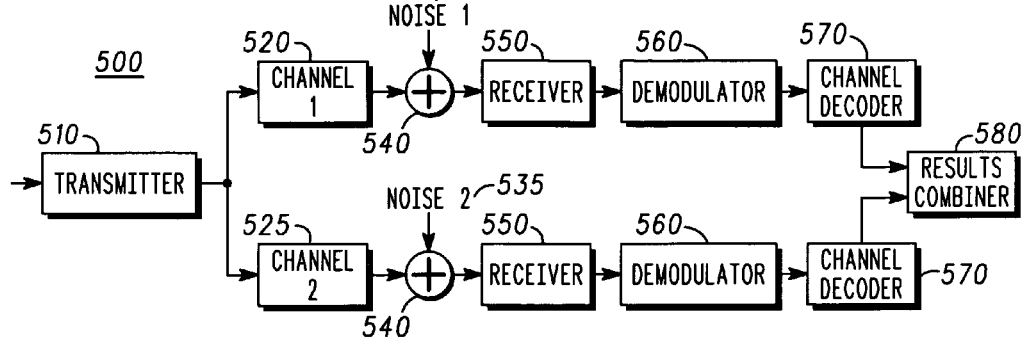
FIGS. 5a to 5c show block diagrams of various baseband processing arrangements of a communication unit adapted to support the various inventive concepts of a preferred embodiment of the present invention.

Referring now to FIG. 5a, a UMTS transmitter/UE receiver arrangement 500 is shown in accordance with the preferred embodiments of the present invention. A transmitter 510, for example a transmitter of a Node B, transmits on first and second communication channels 520, 525 to two UE receivers 550. During the transmission, the signals would be subjected to noise 530, 535, 540, multipath and rayleigh fading effects as is known in the art. In either the case of transmitting a sequence of data blocks to individual UEs for subsequent combining at a single UE, or the case of transmitting the same data blocks to all UEs for increased reliability a number of independent receivers 550 are used (with two being shown for clarity purposes only).

In the case of joint decoding, the UE 112 (master unit) that is to receive demodulated samples from each of the selected neighbor UEs (slave units) may decode the information in a number of ways. FIG. 5a shows a first manner of decoding whereby each UE receiver performs its own demodulation 560 and channel decoding 570 on its received data, prior to UE 112 combining the forwarded decoded results 580. Such a combining operation may encompass, for example, a simple decision process of accepting a block that passes a cyclic redundancy check (CRC). In this case, the two received signals are configured to be on the same physical channel (or time-slot in GSM/TDMA systems). The physical channels cannot be heterogeneous, in that each unit experiences a different channel propagation conditions.

Figure 5B:
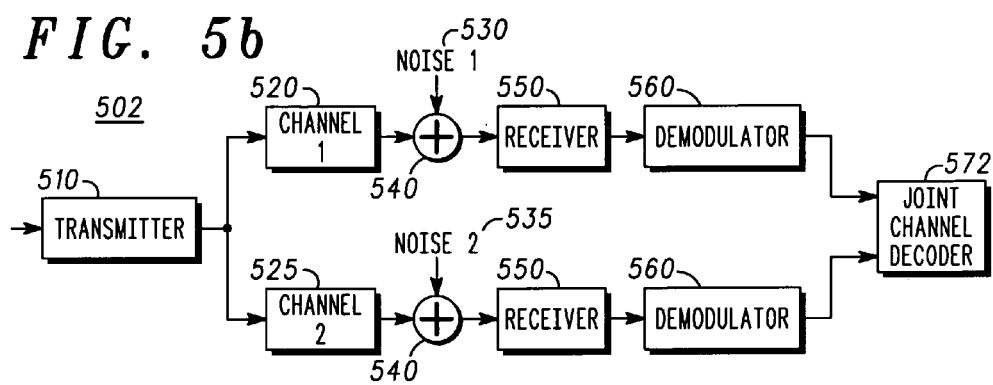
Figure 5C:
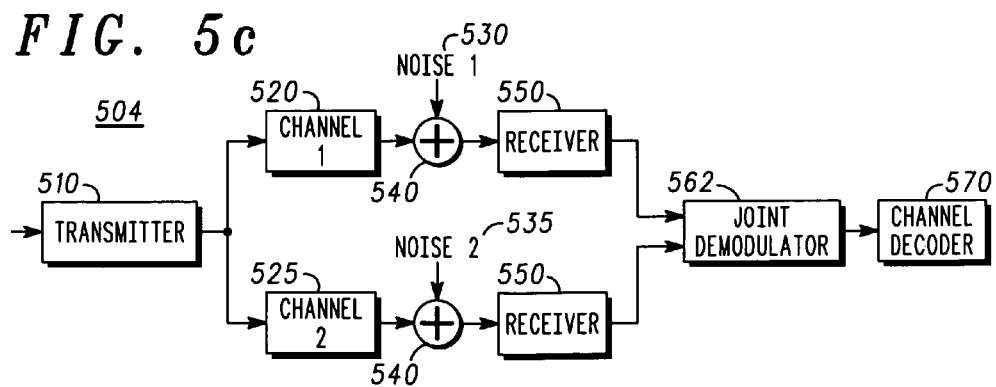

FIG. 5b shows a second manner of decoding whereby each UE receiver performs its own demodulation 560 and the independently demodulated data is forward, in each case, to a joint channel decoding function 572 in the UE 112. In this manner, UE-1 112 is able to perform its own channel decoding for each received demodulated signal, thereby saving the computational effort in its neighboring UEs of providing channel decoded information.

Embodiment 7—Joint Equalization

However, given that the channels are normally non-correlated, the combination of information can also be performed before channel equalization as well, as shown in FIG. 5c. FIG. 5c therefore shows a third manner of decoding whereby each receiver provides its received signal to the UE 112, and the UE 112 then performs joint demodulation 562 prior to joint channel equalization and joint channel decoding 570.

In the manners detailed above in embodiment 6 and 7, the invention exploits spatial diversity. Each of the members in, say an aggregate embodiment, is used as a separate antenna element together with various levels of receiver ciruitry. This type of beneficial combination, using multiple received signals, improves reliability of the received signal(s).

Embodiment 8—Rake Combining

In yet a further receiver decoding embodiment, for example when applied to a UMTS-FDD (CDMA) system, the multiple selected neighboring UEs may use different codes or the same code. If the same code is used, the UE-1 receiver in a downlink embodiment (or Node B receiver in an uplink embodiment) would perceive the various received information signals as multipath effects. Hence, the different signals could be combined in a RAKE receiver.

In the alternative, if the information were sent using different codes, the output of the two or more different RAKE receivers could be combined. As before with embodiments 6 and 7, the RAKE receiver embodiment effectively realizes diversity improvement. Naturally, in this case a signalling protocol message would be necessary to inform a Node B that multiple codes were in use, as known to those skilled in the art.

Embodiment 9—Multi-Mode Operation

The inventors of the present invention further envisage applying the aforementioned functionality enhancement capability to multi-mode communication units and/or multiple of single (but different) mode communication units. In the latter case, two communication units supporting two different multiple access schemes would be combined to provide a single multi-mode communication service for the duration of the time that they are combined.

In the preferred configuration of embodiment 9, it is assumed that one user employs, for example a GSM phone and another user a UMTS phone (or a software definable radio (SDR)). It is envisaged that the GSM user can utilise the capabilities of the UMTS communication unit to obtain higher throughput and/or a better quality of service.

Furthermore, particularly when re-using a communication unit that is in an idle mode, redundancy and cost savings an be achieved. For example, it is envisaged that a wideband CDMA (WCDMA) cellular communication unit can work in non-compressed mode even with just one receive path whilst exchanging neighbor cell information with a GSM phone.

As an example let us assume that the configuration of the communication link will be:
  (i) UE-A is a GSM-only unit;
  (ii) UE-B is UMTS unit; and
  (iii) X is a UMTS Node B.

In idle mode, for example, UE-B is requested by UE-A (or the network) to create a UMTS radio link with its serving node B-X. UE-B then waits for transmissions from UE-A, say via a bluetooth connection, and forwards such uplink information to its serving node B-X. In effect, UE-B is used as a communication translator, as UE-A does not have the capabilities/functionality to communicate on the UMTS system. However, UE-A and UE-B are both Bluetooth-capable.

It is within the contemplation of the above communication enhancement could be applied to a downlink scenario, for example forwarding information to a GSM communication unit that is temporarily out of the coverage range of the GSM system.

In all of the above architectures, the inventors of the present invention have envisaged that at least two modes of operation can be considered:
  (i) Permanent transmission mode: where the selected neighboring UEs always, and substantially immediately, echo the signals that they receive intended for an alternative UE; or
  (ii) On-Request transmission mode: where selected neighboring UEs receive signals intended for an alternative UE and store them in memory. Stored and received signals are then re-transmitted to the UE 112, upon receipt of a request from UE-1 112, through say, the short-range bluetooth interface or a wired bus.

Let us now consider these two modes of operation in more detail.

Embodiment 10—Permanent Transmission Mode

In a permanent transmission mode of operation, the selected neighboring UEs are configured effectively as repeater units, i.e. they are configured to re-transmit the data blocks as soon as they are received. This mode of operation is therefore particularly applicable to the RAKE receiver configuration of embodiment 7, where simultaneous receipt of numerous signals can be handled with ease. Furthermore, the permanent transmission mode is also well suited to the emergency call arrangement of embodiment 3, where immediate transmission of the emergency call data is desired.

Embodiment 11—On-Request Transmission Mode

As an alternative to the permanent transmission mode of operation of embodiment 10, the inventors of the present invention also envisage opportunities for transmission on request. On-request transmission mode of operation requires the selected neighboring UEs to receive signals and store them in memory. Stored signals are then re-transmitted upon receipt of a UE 112 request it through say, the short-range bluetooth interface of wired bus.

As an example, a down-link transmission from a Node B-X to a UE-A operably coupled to another UE-B, say via a short-range Bluetooth link, could be made, for example using the on-request transmission mode of embodiment 11 and, say, the joint Decoding arrangement of embodiment 6.

Such a down-link transmission may be described through the following events:
  (i) Node B-X transmits a signal to UE-A. It is assumed that UE-A and UE-B receive the same signal, albeit modified by the two different channel propagation conditions. Both UE-A and UE-B store these signals.
  (ii) UE-A performs some processing on its stored signals to demodulate and decode its received signal. If we assume that the final CRC determined by UE-A is incorrect, UE-A transmits a request, via the bluetooth short-range radio link (or wired bus) asking for a repeat transmission of the signal from Node B-X.
  (iii) UE-B receives this request. In response to the request, UE-B retrieves the received signal from its memory, performs a demodulation operation on the received signal and then transmits the demodulated signal via the same bluetooth short-range radio link (or wired bus) to UE-A.

In the alternative, if we assume that UE-B does not, at that time, have the processing resource to perform the necessary demodulation, it is within the contemplation of the invention that UE-B could echo the raw received signal to UE-A. UE-A could then choose to process joint decoding or to switch to joint equalization, as described above with respect to embodiment 6 or 7.
  (iv) When UE-A receives a positive answer from UE-B, namley the provision of a demodulated signal intended for UE-A, UE-A is able to perform a joint decoding operation according to the arrangement of FIG. 5a.
  (v) UE-A may then determine, after the final CRC, that the signal burst from Node B-X is properly decoded. Consequently, UE-A would not request a re-transmission of the burst using the communication standard's protocol, thereby leaving more resource to Node B-X and the cellular system.

If the UE 112, which requests assistance from its selected neighboring UEs, fails to receive a positive answer to the request, it is within the contemplation of the invention that UE 112 can still use any available re-transmission protocol, as typically provided in most communication standards.

It is within the contemplation of the invention that the aforementioned method can be used in both the uplink and the downlink direction. For example, a user that wishes to transmit information to the cellular system might send that information to at least one member of the aggregated group, which subsequently transmits the information to the network.

Embodiment 12:

Private area networks typically consist of two or more users in a local network that use a local wireless access technique and a single connection through one or more gateway communication units to an external network. An example of such a network would be the BlueTooth standard where an ISM band private area network is formed within a very small radius (say 50 metres).

The local area network is thus very small and to a certain extent a communication unit will have reasonable line-of-sight connections to neighboring communication units, with low propagation loss and low delays. It is known that the weak link in such a private area network is (if it is a wireless network) the external wireless connection to the local area network. Furthermore, this weakest link to the external area network will, of course, become the bottleneck for all other user communications. Usually one communication unit acts as the gateway to the external network and all other local private area UEs communicate to the external network (this could be an inter or intra-net) via this gateway communication unit (or UE).

In accordance with a preferred aspect of embodiment 12 of this invention, it is assumed that two or more users in the private area network are likely to be spatially separated. As such, they are also assumed to provide a degree of spatial diversity to the external network link. This could be in the form of a beam to the external network using each of the UEs in the private area network as one 'antenna element' of the beam, in the classical sense. Alternatively it could be of the form of switching each of the 'primary' links in a regular fashion to give a degree of spatial diversity.

In accordance with the preferred aspect of embodiment 12 the external network link is not reliant upon one gateway communication unit (or gateway UE). Advantageously, the external network link is now distributed amongst a number of users in the private area network. Switching may occur in the uplink and downlink or in the downlink through maximal ratio combining the signals from all users in the private area network to provide a composite reliable external link.

The above solution has the advantage that the larger the private area network, the better the diversity gains and the more reliable the external link. A significant benefit of this is that the larger private area networks would have a higher data throughput to the external network.

Consequently, embodiment 12 provides the novel features of applying antenna diversity principles to a wireless private area network with a wireless external internet or intranet connection. Furthermore, the collective use of UE members of a wireless private network, to provide the most reliable uplink and downlink connection without using more external network resources is of substantial benefit.

In addition, the collective use of members in a private area network to provide redundancy in the external network connection is believed to be both novel and attractive to private network manufacturers and operators. Also, as the number of users in the private area network increases, so does the diversity gain in the external link. This is advantageous because the higher the number of users in the private area network the higher the external bandwidth requirement is likely to be.

In summary, the inventive concepts described herein provide, with respect to the known prior art, greater throughput by using multiple detection. Furthermore, new functions and applications such as a more-effective multi-mode operation, where each individual unit is capable of being separated and used as a UE. When together, they can be configured to work co-operatively. Furthermore, a new alternate emergency call function is realised, in contrast to known multi-mode/multiple-terminal pack units.

It will be understood that the linking of multiple communication units described above provides the following advantages:

(i) The improvement to a single subscriber communication unit in a downlink reception mode is substantially equal to an improvement provided by having multiple receiving antennas.

(ii) The collective use of communication units to form an aggregate group, provides each user with a more reliable uplink and downlink communication channel without using more network resources.

(iii) Assuming that the antenna of each of the communication units is not correlated, the combined block error rate (BLER) of the multiple receivers assisting in a downlink communication link enhancement mode is multiplied. If the BLER of first receiver was 0.3 and that of a second was 0.2, the combined receiver operates at 0.06 which corresponds to a gain of a few dB that is hard to realise on a single receiver.

(iv) The cost of the combined system is much less, as each subscriber communication unit does not need to be designed to have maximum functionality—the units can utilise the functionality or higher-tier capabilities of neighboring communication units, as and when required.

(v) New functions may be realised, with the functionality re-use/enhancement provisions.

(vi) The radio link efficiency is improved and the reliability of communication is increased.

(vii) Substantially higher data rates for downlink and/or uplink communications are realised.

Whilst the specific, and preferred implementations of the embodiments of the present invention are described above, it is clear that variations and modifications of such invnetive concepts could be readily applied by one skilled in the art.

What is claimed is:

1. A method of enhancing a communication capability of a communication unit operating in a communication system that facilitates communication to and/or from a plurality of communication units, the method comprising the step of:

operably coupling a first communication unit to one or more neighboring communication units such that said communication unit is able to utilize at least one operational capability of one or more of its neighboring communication units to enhance communication to and/or from said first communication unit;

failing to decode, by said first communication unit, information sent to said first communication unit; and, in response to said step of failing requesting by said first communication unit whether any of said one or more selected neighboring communication units received such information; and receiving said information, forwarded in response to said request, from said one or more selected neighboring communication units.

2. The method of enhancing a communication capability of a communication unit according to claim 1, the method further comprising the step of:

performing a polling operation, by said first communication unit, of said neighboring communication units to discover one or more neighboring communication units that are able to enhance communication to and/or from said first communication unit.

3. The method of enhancing a communication capability of a communication unit according to claim 1, the method further comprising the step of:

performing a polling operation, by a central unit in said communication system, to discover one or more neighboring communication units of said first communication unit to use in enhancing communications from said central unit to said first communication unit.

4. The method of enhancing a communication capability of a communication unit according to claim 2, wherein said step of operably coupling or said step of polling is performed using a short-range wireless connection or a wired bus.

5. The method of enhancing a communication capability of a communication unit according to claim 4, wherein said short-range wireless connection is a bluetooth adjunot to the communication system.

6. The method of enhancing a communication capability of a communication unit according to claim 1, the method further comprising the step of:

utilizing a first neighboring communication unit, to enhance communication to and/or from said first communication unit based on a determined geographical location of said first neighboring communication unit.

7. The method of enhancing a communication capability of a communication unit according to claim 1, wherein a number of the one or more neighboring communication units carry different amounts of data, for example based on individual link conditions.

8. The method of enhancing a communication capability of a communication unit according to claim 1, the method further comprising the step of:

coordinating by a number of said plurality of said communication units to form an aggregated group of communication units for achieving enhanced communication functionality as a group.

9. The method of enhancing a communication capability of a communication unit according to claim 8, wherein a number of said aggregated group of communication units transmit link condition information to a central unit in said communication system.

10. The method of enhancing a communication capability of a communication unit according to claim 8, the method further comprising the step of:

establishing a number of said communication units of said aggregated group of communication units to enhance communication to and/or from other members of the group when said number are inactive.

11. The method of enhancing a communication capability of a communication unit according to claim 8, wherein said first communication unit is arranged as a master communication unit coordinating larger data throughput communication to and/or from sad neighboring communication units operating as slave communication units.

12. The method of enhancing a communication capability of a communication unit according to claim 1, wherein said operable coupling of said communication units is arranged to enhance uplink communication.

13. The method of enhancing a communication capability of a communication unit according to claim 12, wherein said neighboring communication units are used by said first communicating unit for an emergency call.

14. The method of enhancing a communication capability of a communication unit according to claim 1, wherein said operably coupling of said communication units is arranged to enhance downlink communication.

15. The method of enhancing a communication capability of a communication unit according to claim 14, the method further comprising the steps of:

forwarding automatically to said first communication unit, from any of said selected neighboring communication units, any communication intended for said first communication unit that is received by any of said selected neighboring communication units.

16. The method of enhancing a communication capability of a communication unit according to claim 1, the method further comprising the steps of:

combining, in said first communication unit, one or more received copies of said information forwarded by any of said selected neighboring communication units.

17. The method of enhancing a communication capability of a communication unit according to claim 16, wherein the step of combining includes the step of:

performing in a number of receivers of said selected neighboring communication units demodulation of information intended for said first communication unit;

performing in a number of receivers of said selected neighboring communication units, channel decoding of said demodulated information; and combining said channel decoded information from said number of receivers of said selected neighboring communication units in said first communication unit.

18. The method of enhancing a communication capability of a communication unit according to claim 16, wherein the step of combining includes the step of:

performing in a number of receivers of said selected neighboring communication units demodulation of information intended for said first communication unit; and combining said demodulated information from said number of receivers of said selected neighboring communication units in said first communication unit.

19. The method of enhancing a communication capability of a communication unit according to claim 18, wherein the step of combining said demodulated information further includes the step of:

performing joint channel decoding in said first communication unit.

20. The method of enhancing a communication capability of a communication unit according to claim 16, wherein the step of combining includes the step of:

forwarding received information from said number of receivers of said selected neighboring communication units to said first communication unit;

combining said forwarded received information in said first communication unit; and performing joint demodulation of said combined information in said first communication unit.

21. The method of enhancing a communication capability of a communication unit according to claim 20, the method further comprising the step of:

performing channel equalization of said joint demodulated information; and performing channel decoding of said channel equalized information.

22. The method of enhancing a communication capability of a communication unit according to claim 14, the method further comprising the step of:

transmitting by said first communication unit a no-acknowledgement message (nack) to said selected neighboring communication units when a forwarded message is not successfully received by said first communication unit; or transmitting by said first communication unit an acknowledgement message (ack) to said selected neighboring communication units when a forwarded message is successfully received by said first communication unit.

23. The method of enhancing a communication capability of a communication unit according to claim 1, wherein said first communication unit and at least one of said selected neighboring communication units operate on different wireless communication systems.

24. The method of enhancing a communication capability of a communication unit according to claim 23, wherein said different wireless communication systems include two or more of the following: a GSM communication system, a bluetooth communication system, a UMTS communication system.

25. The method of enhancing a communication capability of a communication unit according to claim 23, wherein said first communication unit and/or at least one of said selected neighboring communication units is capable of multimode operation in each of said different wireless communication systems, such that said multi-mode operation, facilitates said step of operably coupling said first communication unit and said at least one of said selected neighboring communication units to provide a single multi-mode communication service for a duration of time that said first communication unit md said at least one of said selected neighboring communication units are operably coupled.

26. A portable communication unit operating in a communication system that facilitates communication to and/or from a plurality of communication units, the communication unit comprising:
   a receiver and transmitter; and
   a processor coupled to the receiver and transmitter; the processor coupling the portable communication unit to one or more neighboring communication units such that said communication unit is able to utilize at least one operational capability of one or more of its neighboring communication units to enhance communication to and/or from said first communication unit; wherein when the processor fails to decode information sent to the portable communication unit, the processor responds by requesting whether any of said one or more selected neighboring communication units received such information; and, in the affirmative, the processor operates to receive said information, forwarded in response to said request, from said one or more selected neighboring communication units.

27. The portable communication unit according to claim 26, wherein the processor is a baseband processing circuit, wherein the baseband processing circuit receives transmissions from one or more neighboring portable communication units, said baseband processing circuit including at least one of the following to recover information intended for said portable communication unit:
   a combining circuit combining channel decoded information from said one or neighboring portable communication units;
   a joint channel decoding circuit for combining received demodulated information from said one or neighboring portable communication units; and
   a joint demodulator circuit to combine and demodulate information received from said one or neighboring portable communication units.

28. The portable communication unit according to claim 27, wherein the portable communication product is one of: a cellular phone, a portable or mobile radio, a personal digital assistant, a laptop computer or a wirelessly networked PC.

* * * * *